United States Patent
Lu et al.

(10) Patent No.: US 9,641,673 B2
(45) Date of Patent: May 2, 2017

(54) METHOD, NETWORK ELEMENT, AND SYSTEM FOR ASSESSING VOICE QUALITY

(71) Applicant: Huawei Technologies Co., Ltd., Shenzhen, Guangdong (CN)

(72) Inventors: Chunmei Lu, Xi'an (CN); Hongbo Yang, Shenzhen (CN); Yunjuan Xie, Shenzhen (CN); Haijiao Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 243 days.

(21) Appl. No.: 14/630,081

(22) Filed: Feb. 24, 2015

(65) Prior Publication Data

US 2015/0172455 A1 Jun. 18, 2015

Related U.S. Application Data

(63) Continuation of application No. PCT/CN2013/081521, filed on Aug. 15, 2013.

(30) Foreign Application Priority Data

Aug. 24, 2012 (CN) .......................... 2012 1 0305625

(51) Int. Cl.
*H04L 1/00* (2006.01)
*H04L 12/26* (2006.01)
(Continued)

(52) U.S. Cl.
CPC ...... *H04M 3/2236* (2013.01); *H04L 41/5067* (2013.01); *H04W 24/10* (2013.01)

(58) Field of Classification Search
None
See application file for complete search history.

(56) References Cited

U.S. PATENT DOCUMENTS 6,208,957 B1 * 3/2001 Nomura ................. G10L 19/04
704/207
6,735,567 B2 * 5/2004 Gao ....................... G10L 19/00
704/220

(Continued)

FOREIGN PATENT DOCUMENTS

| CN | 1625086 A | 6/2005 |
| CN | 102340426 A | 2/2012 |
| CN | 102448083 A | 5/2012 |

OTHER PUBLICATIONS

"The E-model: a computational model for use in transmission planning, Amendment 1: New Appendix IV—Use of the E-model in conjunction with noise reduction or echo canceller systems in the network or the terminal equipment", Recommendation ITU-T G.107 (2011)—Amendment 1, Jun. 2012, 8 pages.

*Primary Examiner* — Kenny Lin (57) ABSTRACT

Embodiments of the present invention disclose a method, a network element, and a system for assessing voice quality, which relates to the communications field and solves a problem that user perception cannot be reflected according to a voice quality assessment result. The method includes acquiring a voice code stream, and collecting statistics on a transmission parameter in each short-time assessment period; decoding the voice code stream, and collecting statistics on a source parameter according to the decoded voice code stream; and calculating a comprehensive voice quality assessment result according the transmission parameter and the source parameter. The present invention is used for voice quality assessment.

13 Claims, 5 Drawing Sheets

(51) Int. Cl.
 H04M 3/22 (2006.01)
 H04L 12/24 (2006.01)
 H04W 24/10 (2009.01)

(56) References Cited

U.S. PATENT DOCUMENTS

| | | | |
|---|---|---|---|
| 8,184,537 B1 * | 5/2012 | Gopal | H04M 3/2236 370/235 |
| 2009/0238085 A1 * | 9/2009 | Khanduri | H04L 41/5009 370/252 |
| 2014/0006016 A1 * | 1/2014 | Qi | G10L 19/24 704/201 |
| 2014/0358526 A1 * | 12/2014 | Abdelal | G10L 25/30 704/202 |

* cited by examiner

FIG. 8

METHOD, NETWORK ELEMENT, AND SYSTEM FOR ASSESSING VOICE QUALITY

CROSS-REFERENCE TO RELATED APPLICATION

This application is a continuation of International Application No. PCT/CN2013/081521, filed on Aug. 15, 2013, which claims priority to Chinese Patent Application No. 201210305625.X, filed with the Chinese Patent Office on Aug. 24, 2012, both of which are incorporated herein by reference in their entireties.

TECHNICAL FIELD

The present invention relates to the communications field, and in particular, to a method, a network element, and a system for assessing voice quality.

BACKGROUND

Under environment where a market of wireless communications grows rapidly and becomes increasingly competitive and the market evolves to be more and more complex, how to improve user satisfaction, reduce a churn rate, and mine a potential value and a profit growth point of a user while focusing on stable operating of a mature telecommunications provider's own network has become a key for the mature telecommunications provider to protect a competitive advantage and contend for a leading role in a future market.

Most existing network assessment systems are based on a key performance indicator (Key Performance Indicator, KPI) analysis on a network element. A KPI analysis system acquires, from a network server, multiple pieces of data such as the number of call drops, a conversation quality parameter, the number of successful short-message receiving/a success rate of short-message receiving, an average short-message sending duration, a failure rate of calling access, and a failure rate of called access, performs an analysis operation on the data, assesses network quality, analyzes a network fault, and regulates operational management of a network. This type of KPI analysis system may relatively objectively and accurately analyze network communication quality and a fault cause. However, in the KPI analysis system, network resource quality is described from a perspective of a network side, but practical feelings of a user during an actual application of the network are not described. Therefore, a provider has gradually transferred his focus on the conventional KPI indicator to assessment on terminal user perception.

Currently voice quality assessment is performed for a Code Division Multiple Access (Code Division Multiple Access, CDMA) network mainly by using the following method, that is, performing assessment on loss of voice quality based on a transmission parameter, where the transmission parameter is mainly a parameter, such as a frame error rate, a handover frequency, and a signaling preemption situation, for a wireless link. This assessment method based on a transmission parameter can only reflect loss of voice in a transmission process and show only quality of a bearer network, which are not equivalent to actual user perception.

In a process of implementing the foregoing voice quality assessment, it is found that at least the following problems exist in the prior art: Because voice quality of a conversation is assessed only according to a transmission parameter that reflects quality of a bearer network, communication quality of a user cannot be assessed from a perspective of the user, and therefore actual user perception cannot be reflected.

SUMMARY

Embodiments of the present invention provide a method, a network element, and a system for assessing voice quality, so as to output a voice quality assessment result that reflects user perception.

According to one aspect of the present invention, a method for assessing voice quality is provided, including:

acquiring a voice code stream, and collecting statistics on a transmission parameter in each short-time assessment period;

decoding the voice code stream, and collecting statistics on a source parameter according to the decoded voice code stream; and calculating a comprehensive voice quality assessment result according to the transmission parameter and the source parameter.

Further, after the collecting statistics on a transmission parameter in each short-time assessment period, the method further includes:

calculating a short-time voice quality assessment result in each short-time assessment period according to the transmission parameter in each short-time assessment period.

Further, the transmission parameter includes at least a packet loss rate, a burst packet loss ratio, a codec type, a situation in which signaling preempts voice, and a handover frequency.

The source parameter includes at least one of the following: sound volume, background noise, clipping, and echo strength.

Further, a method for collecting statistics on the packet loss rate includes: identifying a frame type of the voice code stream to distinguish between a voice frame and a mute frame; and collecting statistics on a packet loss rate of the voice frame; and a method for collecting statistics on the burst packet loss ratio includes: identifying successive packet loss in the voice frame according to types of frames before and after a packet loss position; and collecting statistics on the burst packet loss ratio according the successive packet loss.

Further, the calculating a comprehensive voice quality assessment result according to the transmission parameter and the source parameter further includes:

selecting an assessment model according to the codec type;

accumulating the transmission parameter in each short-time assessment period to obtain a call-level transmission parameter; and substituting the call-level transmission parameter and the source parameter into the assessment model to calculate the comprehensive voice quality assessment result.

Further, the method for assessing voice quality further includes:

reporting the transmission parameter, the source parameter, and the short-time voice quality assessment result to a call history record (CHR) system, so that an external tool calculates an end-to-end voice quality assessment result according to the transmission parameter, the source parameter, the short-time voice quality assessment result, and a transmission parameter, a source parameter, and a short-time voice quality assessment result of a peer end.

According to another aspect of the present invention, a network element is further provided, including:

a transmission statistics collecting unit, configured to acquire a voice code stream, and collect statistics on a transmission parameter in each short-time assessment period;

a source statistics collecting unit, configured to decode the voice code stream, and collect statistics on a source parameter according to the decoded voice code stream; and a calculating unit, configured to calculate a comprehensive voice quality assessment result according to the transmission parameter collected by the transmission statistics collecting unit and the source parameter collected by the source statistics collecting unit.

Further, the network element further includes:

a short-time assessment unit, configured to calculate a short-time voice quality assessment result in each short-time assessment period according to the transmission parameter, which is collected by the transmission statistics collecting unit, in each short-time assessment period.

Further, the transmission parameter collected by the transmission statistics collecting unit includes at least a packet loss rate, a burst packet loss ratio, a codec type, a situation in which signaling preempts voice, and a handover frequency; and the source parameter collected by the source statistics collecting unit includes at least one of the following: sound volume, background noise, clipping, and echo strength.

Further, the transmission statistics collecting unit includes:

a packet loss rate statistics collecting module, configured identify a frame type of the voice code stream to distinguish between a voice frame and a mute frame; and collect statistics on a packet loss rate of the voice frame; and a burst packet loss ratio statistics collecting module, configured to identify successive packet loss in the voice frame according to types of frames before and after a packet loss position, and collect statistics on a burst packet loss ratio according to the successive packet loss.

Further, the calculating unit includes:

a selecting module, configured to select an assessment model according to the codec type;

an accumulating module, configured to accumulate the transmission parameter in each short-time assessment period to obtain a call-level transmission parameter; and an assessing module, configured to substitute the call-level transmission parameter accumulated by the accumulating module and the source parameter collected by the source statistics collecting unit into the assessment model to calculate the comprehensive voice quality assessment result.

Further, the network element further includes:

a sending unit, configured to report the transmission parameter collected by the transmission statistics collecting unit, the source parameter collected by the source statistics collecting unit, and the short-time voice quality assessment result calculated by the short-time assessment unit to a call history system CHR, so that an external tool calculates an end-to-end voice quality assessment result according the transmission parameter, the source parameter, the short-time voice quality assessment result, and a transmission parameter, a source parameter, and a short-time voice quality assessment result of a peer end.

According to another aspect of the present invention, a system for assessing voice quality is provided, including:

at least two network elements; and a call history system CHR; where:

the network elements are configured to acquire a voice code stream, and collect statistics on a transmission parameter in each short-time assessment period; decode the voice code stream, and collect statistics on a source parameter according to the decoded voice code stream; and calculate a comprehensive voice quality assessment result according to the transmission parameter and the source parameter; and the CHR is configured to receive transmission parameters, source parameters, and short-time voice quality assessment results, which are sent by the at least two network elements, so that an external tool calculates an end-to-end voice quality assessment result.

According to the method, network element, and system for assessing voice quality in embodiments of the present invention, a comprehensive voice quality assessment result is calculated by collecting statistics on a transmission parameter corresponding to a voice code stream and on a source parameter corresponding to a decoded voice code stream. Compared with a method for assessing voice quality in the prior art, in which statistics is collected only on a transmission parameter corresponding to a voice code stream, the source parameter that can reflect user perception is brought in, so that the voice quality assessment result not only can reflect network transmission quality, but also can reflect actual user perception.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
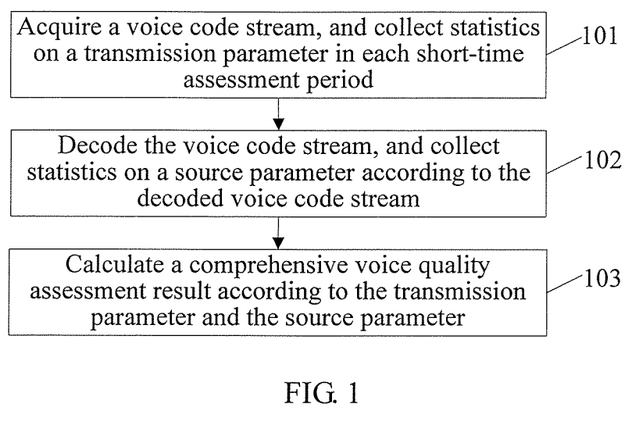
FIG. 1 is a flowchart of a method for assessing voice quality according to Embodiment 1 of the present invention.

This embodiment of the present invention provides a method for assessing voice quality. As shown in FIG. 1, the method may include:

101. Acquire a voice code stream, and collect statistics on a transmission parameter in each short-time assessment period.

A network element may acquire a voice code stream in a voice conversation process. The network element may be a base station controller (Base Station Controller, BSC) or another device on a network side, such as a service processing board, and a device board that a transcoder (TC) belongs, which is not limited in this embodiment of the present invention.

The transmission parameter fluctuates relatively strongly during a conversation. Therefore, short-time assessment, in which a time period when user perception generates is deemed as an assessment period, may be used. For example, a short-time assessment period may be 8 s. Record a transmission parameter every 8 s, and then calculate a short-time voice quality assessment result corresponding to the every 8 s separately according to the transmission parameter corresponding to the every 8 s. Each short-time voice quality assessment result can reflect voice quality in each short-time assessment period. The short-time voice quality assessment result may be used as a score of a short-time voice quality indication (Voice Quality Indication, VQI).

102. Decode the voice code stream, and collect statistics on a source parameter according to the decoded voice code stream.

The source parameter is relatively stable in an entire call process. Therefore, a source parameter corresponding to a voice code stream generated in an entire call process may be used to perform call-level assessment. An assessment result obtained through the call-level assessment can reflect voice quality in an entire call process.

103. Calculate a comprehensive voice quality assessment result according to the transmission parameter and the source parameter.

Herein, transmission parameters and source parameters obtained during the entire process of the call are combined to calculate the comprehensive voice quality assessment result. The comprehensive voice quality assessment result may be used as a score of a call-level comprehensive VQI.

According to the method for assessing voice quality in this embodiment of the present invention, a comprehensive voice quality assessment result is calculated by collecting statistics on a transmission parameter corresponding to a voice code stream and on a source parameter corresponding to a decoded voice code stream. Compared with a method for assessing voice quality in the prior art, in which statistics is collected only on a transmission parameter corresponding to a voice code stream, the source parameter that can reflect user perception is brought in, so that the voice quality assessment result not only can reflect network transmission quality, but also can reflect actual user perception.

Embodiment 2

Figure 2:
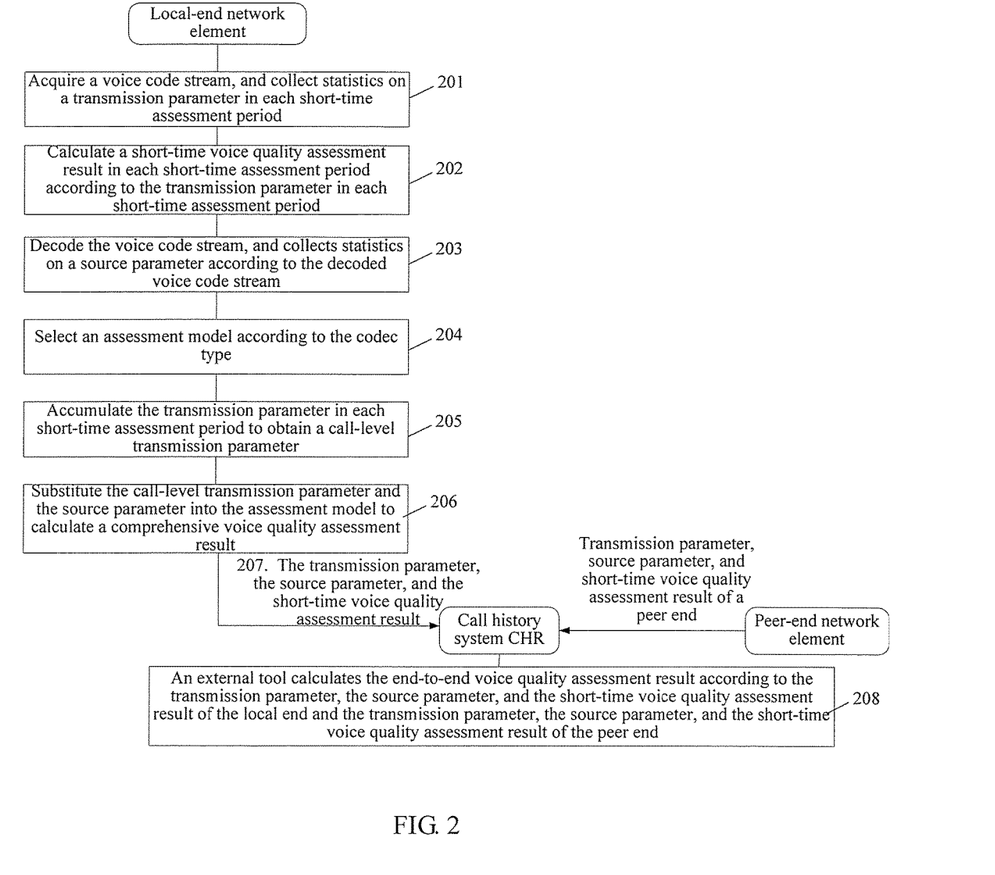
FIG. 2 is a flowchart of a method for assessing voice quality according to Embodiment 2 of the present invention.

This embodiment of the present invention provides a method for assessing voice quality. As shown in FIG. 2, the method includes:

201. A local-end network element acquires a voice code stream, and collects statistics on a transmission parameter in each short-time assessment period.

The transmission parameter is mainly a parameter for a wireless link, such as a codec type, a packet loss rate, a handover frequency, and a signaling frame preemption ratio. A method for collecting statistics on the transmission parameter may be:

Codec type: In a call setup process, a user equipment (Use Equipment, UE) performs a service negotiation with the local-end network element, and according to a negotiation result, the local-end network element acquires a codec type. When a bearer format changes, the codec type will also change. Therefore, the local-end network element needs to update the codec type and record a change moment in a timely manner.

Reverse packet loss rate: The reverse packet loss rate indicates a packet loss rate while a UE sends a voice code stream to a local-end network element. In a voice transmission process, a reverse voice code stream before decoding is inputted in real time, and the local-end network element detects each frame of the voice code stream, collects statistics on the number of lost packets in the voice transmission process, and uses a Gilbert-Elliott 2-State Markov packet loss model describe characteristics of the number of lost packets that is collected in the voice transmission process, so as to obtain a packet loss rate and a burst packet loss ratio. Packet loss for which compensation may be performed by a decoder according to a packet loss concealment capability of a standard decoder is not collected herein.

Further, in order to make a voice quality assessment result more accurate, not to collect statistics on a packet loss situation for mute frames that do not much affect user perception, and to distinguish whether the voice code stream produces an impact on user perception, a method for collecting statistics on the packet loss rate may be: The local-end network element identifies a frame type of the voice code stream, distinguishes a type of a lost frame, that is, whether the lost frame is a voice frame or a mute frame, and then collects statistics on a packet loss rate of the voice frame. The method for identifying a frame type is: determining whether a lost frame is a voice frame or a mute frame according to frame types of frames before and after a frame loss position.

Burst packet loss ratio: Successive packet loss in the voice frame is identified according to the types of frames before and after a packet loss position and statistics are collected on a burst packet loss ratio according to the successive packet loss.

Specifically, it may be that when collecting statistics on the packet loss rate of the voice frame, identify successive packet loss and intermittent packet loss in the voice frames according to the types of frames before and after the packet loss position, and then collect statistics on how many times successive packet loss occurs in the voice frame and how many packets are lost during each time of successive packet loss, so as to obtain a burst packet loss ratio.

In the prior art, statistics collecting on a packet loss rate is a type of extensive statistics collecting. It is unknown that whether a lost packet is lost from a voice frame or from a mute frame, whether a lost packet is in successive packet loss or intermittent packet loss during voice, or whether a decoder performs compensation for the lost packet. A corresponding voice rating is deduced each time a packet is lost, which results in a circumstance where ratings are deduced too much or too little. That is to say, in the prior art it cannot be known which lost packets in the collected lost packets do not cause a damage to voice, or which type of lost packets cause a greater damage, because successive packet loss cause greater damage than intermittent packet loss. In the present invention, statistics is collected on a packet loss type and a packet loss position, no statistics is collected on a mute frame or a frame on which compensation is performed by a decoder, and statistics is collected on successive packet loss and intermittent packet loss situations in voice, so that when statistics is collected on an impact from a transmission parameter to voice quality, the statistics may be collected based on perception.

Forward packet loss rate: The forward packet loss rate indicates a packet loss rate while a local-end network element sends a voice code stream to a UE. There may be two implementation methods for collecting statistics on a forward packet loss rate:

The first method is that the local-end network element acquires the total number of frames and the number of bad frames by using a retrieve parameters message (Retrieve Parameters Message), where the total number of frames and the number of bad frames are collected on a UE side, so as to collect statistics on the packet loss rate. A specific process is as follows: After a call setup is complete, the local-end network element sends a Retrieve Parameters Message to the UE in each short-time assessment period. The UE replies a parameters response message (Parameters Response Message) carrying the total number of frames and the number of bad frames. The local-end network element collects statistics on a forward packet loss rate according to the reply content. The packet loss rate collected using this method includes lost packets of a physical layer and lost packets reused in voice signaling.

The second method is that the local-end network element acquires statistics, which are collected by a UE side, on faulty frames at a physical layer by using a power measurement report message (Power Measurement Report Message) reported by the UE, so as to collect statistics on a forward packet loss rate in each short-time assessment period. The packet loss rate collected using this method only reflects faulty frames on the physical layer, but does not collect statistics on a signaling preemption effect.

Handover frequency: When the UE is handed over, a base station subsystem (Base Station Subsystem, BSS) records the number of handovers, and the local-end network element obtains a handover frequency through calculation, where Handover frequency=Assessment period/Number of handovers (s/times).

Ratio of forward signaling frames preemptive to voice frames: When sending a voice code stream, the local-end network element reuses or discards a signaling frame and a voice frame according to a priority of the signaling frame and a size of the voice frame, so as to collect statistics on a ratio of signaling frames preemptive to voice frames and record reuse and discard situations.

Ratio of reverse full signaling frames: The local-end network element collects statistics on a ratio of reverse full signaling frames according to frame types when receiving frames sent by the UE.

202. The local-end network element calculates a short-time voice quality assessment result in each short-time assessment period according to the transmission parameter in each short-time assessment period.

In short-time assessment, after collecting statistics on the transmission parameter in each short-time assessment period, the local-end network element substitutes the transmission parameter collected in each short-time assessment period into an assessment model that is trained in advance, so as to calculate a short-time voice quality assessment result. The short-time voice quality assessment result reflects user perception in each short-time assessment period in a conversation process, may accurately reflect feelings on different moments in a call process, and may represent a situation in which average feelings in an entire conversation process are good but feelings during a certain period of time in the conversation process are very bad. In addition, in the short-time assessment process, a call-level transmission parameter may be accumulated according to the transmission parameter in each short-time assessment period.

A calculation process of the short-time voice quality assessment is: The rating model may use an assessment method of a device damage factor $Ie$ in the ITU-T G.107, and may be extended by cascading and iteration on the basis of the assessment method.

$$Ie \cdot \mathit{eff} = Ie + (95 - Ie) \times \frac{Ppl}{\frac{Ppl}{BurstR} + Bpl}$$

Figure 3:
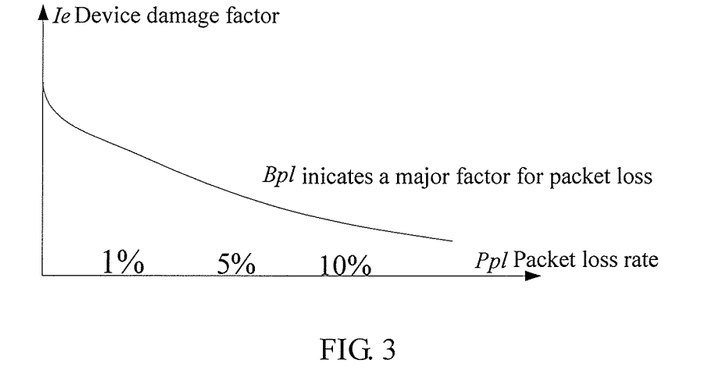
FIG. 3 is a graph for packet loss concealment capabilities of a codec.

$Ppl$ is a packet loss rate, $BurstR$ is a burst packet loss ratio, $Bpl$ indicates a major factor for packet loss, and $Ie$ is a device damage factor. Each codec type has a different $Ie$, where $Bpl$ is determined by a packet loss concealment capability graph, as shown in FIG. 3.

According to a formula in a standard, substitute a measurement result into the formula, and then a short-time voice quality assessment result may be obtained.

203. The local-end network element decodes the voice code stream, and collects statistics on a source parameter according to the decoded voice code stream.

The source parameter may include: voice volume, background noise, clipping, and echo strength. A method for collecting statistics on the source parameter may be:

Voice volume and background noise detection: In a time division multiplexing (Time Division Multiplexing, TDM) scenario, acquire pulse code modulation (Pulse Code Modulation, PCM) voice data outputted by a TC decoder that is built in the local-end network element, analyze the PCM voice data through voice activity detection (Voice Activity Detection, VAD), distinguish between voice and noise, collect statistics on energy in a voice part, and obtain voice volume (in unit of dBm) of an entire segment of conversation. Similarly, collect statistics on energy in a part of background noise, which may also be achieved by analyzing the PCM voice data, and obtain background noise (in unit of dBm) of the entire segment of conversation.

Clipping detection: In a TDM scenario, acquire PCM voice data outputted by the TC decoder that is built in the local-end network element. The local-end network element detects the PCM voice data for signal cut-off distortion (a waveform clipping phenomenon) that is formed because a quantization scope is exceeded, and collects statistics on a clipping ratio in the entire segment of conversation.

Echo strength: In a TDM scenario, acquire voice data (after the voice data is decoded in an uplink direction by a TC) inputted in the uplink direction by the TC that is built in the local-end network element and use it as near-end data, and acquire voice data (before the voice data is decoded in a downlink direction by the TC) outputted in the downlink direction by the TC that is built in the local-end network element and use it as a reference signal. The local-end network element compares, by detecting whether uplink input includes an echo signal of downlink output and through an analysis on a frequency domain, data similarity between the downlink output and the uplink input, collects statistics on signal energy of uplink input that has a relatively high similarity in the entire segment of conversation, and uses the signal energy as echo strength (in unit of dBm).

204. The local-end network element selects an assessment model according to the codec type.

An empirical model of the assessment model comes from training in advance. The empirical model may be trained in different scenarios, for example, different codec types, different networking manners, whether a function related to voice quality is enabled, good\medium\bad air-interface quality, and high\medium\low device load. The empirical model masters a device damage $Ie$ and a packet loss concealment capability graph (Bpl) of each type of codecs through trainings in different scenarios.

The networking manner may be an A-interface TDM manner and an A-interface Internet Protocol (Internet Protocol, IP) manner.

That whether a function related to voice quality is enabled may be any one of the following: whether a transcoder free operation (Transcoder Free Operation, TrFO) or a remote transcoder operation (Remote Transcoder Operation, RTO) is enabled, whether a rate drop mode is used, and whether voice is used to activate a level.

The training may use linear regression, non-linear prediction, an artificial neutral network or another manner.

205. The local-end network element accumulates the transmission parameter in each short-time assessment period to obtain a call-level transmission parameter.

A method for accumulating a packet loss rate may be: Accumulate the total number of lost packets and the total number of packets in the conversation process and calculate a call-level packet loss rate in the conversation process, where Call-level packet loss rate=Number of lost packets/Total number of packets.

A method for accumulating a handover frequency may be: Accumulate the total number of handovers in the conversation process and calculate, according to a known call-level assessment period, a call-level handover frequency in the conversation process. The call-level assessment period indicates a conversation duration of this conversation, for example, if a call-level assessment period is 200 s, Call-level handover frequency=200 s/Total number of handovers.

A method for accumulating a signaling frame preemption ratio may be: Accumulate the number of signaling frames and the total number of frames in the entire conversation process according to the number of signaling frames and the total number of frames in the short-time assessment period and calculate a call-level signaling frame preemption ratio.

206. The local-end network element substitutes the call-level transmission parameter and the source parameter into the assessment model to calculate a comprehensive voice quality assessment result.

The local-end network element sends the transmission parameter and the source parameter to the assessment model, which is trained in advance, for rating, and obtains the comprehensive voice quality assessment result.

A process of calculating the comprehensive voice quality assessment result is: The voice volume, the background noise level, the clipping, and the echo strength can all be mapped to a model in the ITU-T G.107. G.107 defines several dimensions that affect voice quality: R=Ro–Is–Id–Ie+A.

$R$ is a voice quality assessment result, $Ro$ is a basic signal-to-noise ratio, $Is$ is a synchronous damage, $Id$ is a delayed damage, $Ie$ is a device damage factor, and $A$ is an expectation factor.

Impacts of background noise, voice volume, and clipping are included in the basic signal-to-noise ratio $Ro$, and an impact of the echo strength is included in $Is$ and $Id$.

$Ie$ is similar to the $Ie$ calculated in step 202. The basic signal-to-noise ratio $Ro$ may be defined as: Ro=15−1.5(SLR+No). SLR indicates a loudness evaluation value on a sending end, and $No$ indicates a sum of powers of different noise sources.

$$No = 10 lg\left[10^{\frac{Nc}{10}} + 10^{\frac{Nos}{10}} + 10^{\frac{Nor}{10}} + 10^{\frac{Nfo}{10}}\right]$$

Nc indicates a sum of power of all noises caused by a circuit, $Nos$ indicates circuit noise caused by background noise on the sending end, $Nor$ indicates circuit noise caused by background noise on a receive end, and $Nfo$ indicates noise on the receive end.

According to a formula in a standard, substitute a measurement result into the formula, and then a comprehensive voice quality assessment result may be obtained.

The standard provides a relatively large number of dimensions. It is inconvenient to measure another dimension except the dimensions in the patent, and therefore default values are set in the computational formula and deemed as an ideal situation.

207. The local-end network element reports the transmission parameter, the source parameter, and the short-time voice quality assessment result to a call history system CHR.

In this embodiment, a peer-end network element may use a method similar to a method used by the local-end network element, so as to collect statistics on the transmission parameter and the source parameter, assess voice quality, and obtain a comprehensive voice quality assessment result and a short-time voice quality assessment result of a peer end. In order to reflect voice quality of two parties in a call and perform end-to-end assessment, a local-end assessment and a peer-end assessment may be cascaded. The local-end network element reports the transmission parameter, the source parameter, and the short-time voice quality assessment result to the CHR. In addition, the peer-end network element may also report the transmission parameter, the source parameter, and the short-time voice quality assessment result of the peer end to the CHR and input the CHR into an external tool.

208. The external tool calculates the end-to-end voice quality assessment result according to the transmission parameter, the source parameter, and the short-time voice quality assessment result of the local end and the transmission parameter, the source parameter, and the short-time voice quality assessment result of the peer end.

A function of the external tool may be: Associate the CHRs of the local-end network element and the peer-end network element, and assess the uplink direction of the local end and the downlink direction of the peer end. The external tool may adopt offline assessment (in a non-intervention manner) and may also adopt real-time assessment (in an intervention manner).

The association between the local-end network element and the peer-end network element may be achieved by using a calling number, a called number, an International Mobile Subscriber Identity (International Mobile Subscriber Identity, IMSI), and a call duration for association.

Figure 4:
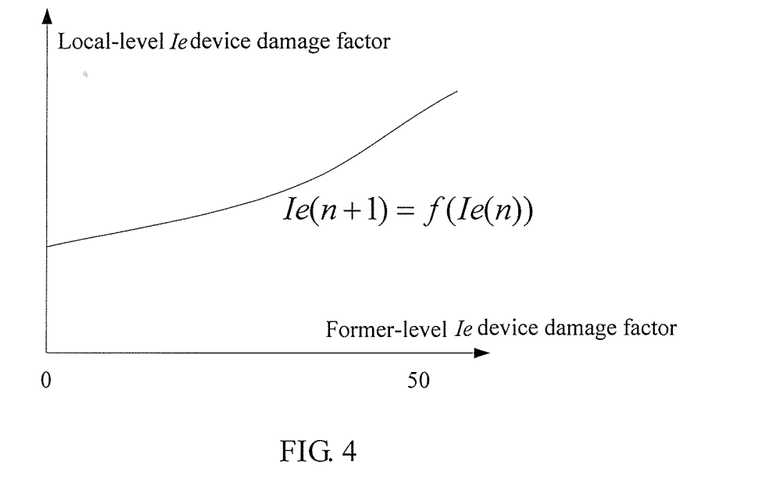
FIG. 4 is a graph for damage iterations for cascading devices.

After the CHR association, a short-time voice quality assessment result on the local end and a short-time voice quality assessment result on the peer end in a same conversation may be acquired to combine with a tandem free operation (Tandem Free Operation, TFO)/TrFO to establish an identifier. In this way, levels of coding and encoding that are performed on a call from a local-end UE to a peer-end UE may be known. According to priori knowledge of each level of coding and encoding, as shown in FIG. 4, the end-to-end voice quality assessment result is obtained by calculating each level by iteration.

The priori knowledge may be obtained by using the following method: Cascading rating depends on a graph for damage iterations for cascading devices using a known codec type, where the graph is measured and trained by using a practical voice quality assessment system in a cascading scenario. When a former-level Ie damage is known, a comprehensive damage effect of the former-level and latter-level damage may be calculated by iteration, so as to predict end-to-end voice quality.

According to the method for assessing voice quality in this embodiment of the present invention, a comprehensive voice quality assessment result is calculated by collecting statistics on a transmission parameter corresponding to a voice code stream and on a source parameter corresponding to a decoded voice code stream. Compared with a method for assessing voice quality in the prior art, in which statistics is collected only on a transmission parameter corresponding to a voice code stream, the source parameter that can reflect user perception is brought in, so that the voice quality assessment result not only can reflect network transmission quality, but also can reflect actual user perception.

In addition, when statistics is collected on a packet loss rate and a burst packet loss ratio, a voice frame and a mute frame in the voice code stream are distinguished and statistics is collected on successive packet loss and intermittent packet loss in the voice frame that have different impacts on user perception, so that statistics on the transmission parameter may also reflect the user perception. A local-end network element and a peer-end network element report transmission parameters, source parameters, and short-time voice quality assessment results to a CHR and input the CHR to an external tool. The external tool calculates an end-to-end voice quality assessment result according to the transmission parameters, the source parameters, and the short-time voice quality assessment results that are reported by the local-end network element and the peer-end network element. Therefore, the voice quality assessment result not only can reflect voice quality on a single end, but also can reflect actual user perception after voice quality experiences end-to-end loss.

Embodiment 3

Figure 5:
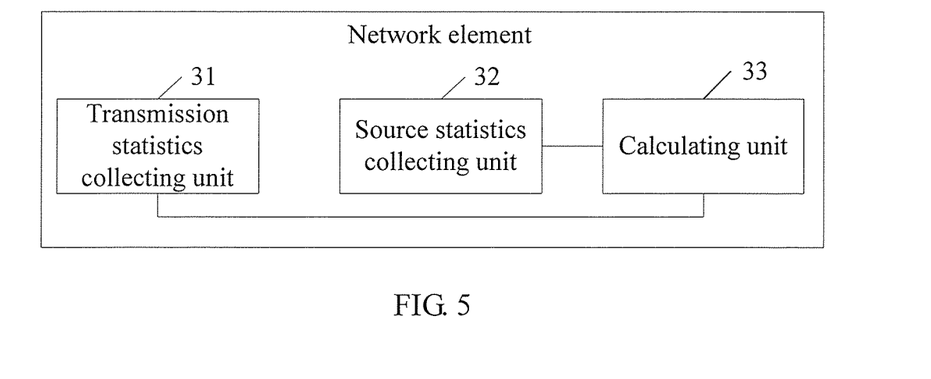
FIG. 5 is a schematic diagram of a network element composition according to Embodiment 3 of the present invention.

This embodiment of the present invention provides a network element, as shown in FIG. 5, including: a transmission statistics collecting unit 31, a source statistics collecting unit 32, and a calculating unit 33.

The transmission statistics collecting unit 31 is configured to acquire a voice code stream, and collect statistics on a transmission parameter in each short-time assessment period.

The source statistics collecting unit 32 is configured to decode the voice code stream, and collect statistics on a source parameter according to the decoded voice code stream.

The calculating unit 33 is configured to calculate a comprehensive voice quality assessment result according to the transmission parameter collected by the transmission statistics collecting unit 31 and the source parameter collected by the source statistics collecting unit 32.

Figure 6:
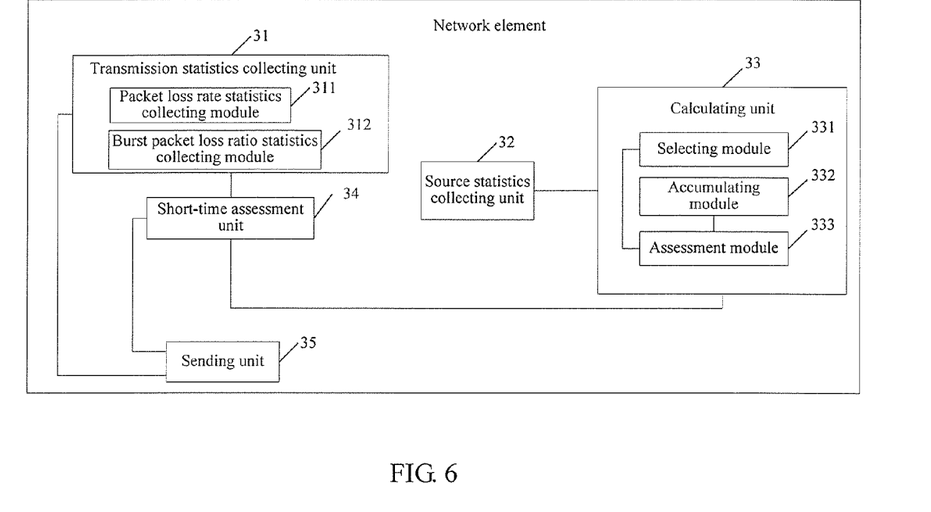
FIG. 6 is a schematic diagram of another network element composition according to Embodiment 3 of the present invention.

Further, as shown in FIG. 6, the network element may further include: a short-time assessment unit 34.

The short-time assessment unit 34 is configured to calculate a short-time voice quality assessment result in each short-time assessment period according to the transmission parameter, which is collected by the transmission statistics collecting unit 31, in each short-time assessment period.

Further, the transmission parameter collected by the transmission statistics collecting unit 31 includes at least a packet loss rate, a burst packet loss ratio, a codec type, a situation in which signaling preempts voice, and a handover frequency.

The source parameter collected by the source statistics collecting unit 32 includes at least one of the following: sound volume, background noise, clipping, and echo strength.

Further, the transmission statistics collecting unit 31 may further include: a packet loss rate statistics collecting module 311 and a burst packet loss ratio statistics collecting module 312.

The packet loss rate statistics collecting module 311 is configured to identify a frame type of the voice code stream to distinguish between a voice frame and a mute frame, and collect statistics on a packet loss rate of the voice frame.

The burst packet loss ratio statistics collecting module 312 is configured to identify successive packet loss in the voice frame according to types of frames before and after a packet loss position, and collect statistics on a burst packet loss ratio according to the successive packet loss.

Further, the calculating unit 33 may further include: a selecting module 331, an accumulating module 332, and an assessment module 333.

The selecting module 331 is configured to select an assessment model according to the codec type.

The accumulating module 332 is configured to accumulate the transmission parameter in each short-time assessment period to obtain a call-level transmission parameter.

The assessing module 333 is configured to substitute the call-level transmission parameter accumulated by the accumulating module 332 and the source parameter collected by the source statistics collecting unit 32 into the assessment model to calculate the comprehensive voice quality assessment result.

Further, the network element further includes: a sending unit 35.

The sending unit 35 is configured to report the transmission parameter collected by the transmission statistics collecting unit 31, the source parameter collected by the source statistics collecting unit 32, and the short-time voice quality assessment result calculated by the short-time assessment unit 34 to a call history system CHR, so that an external tool calculates an end-to-end voice quality assessment result according to the transmission parameter, the source parameter, the short-time voice quality assessment result, and a transmission parameter, a source parameter, and a short-time voice quality assessment result of a peer end.

Figure 7:
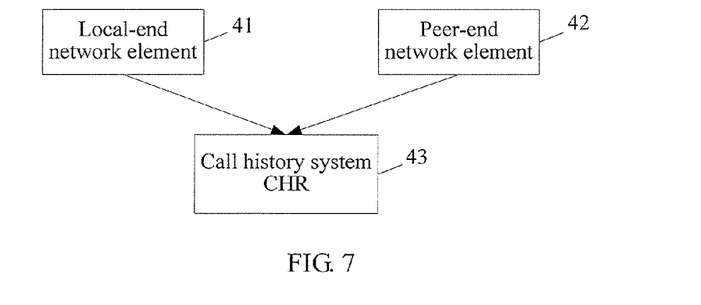
FIG. 7 is a schematic diagram of composition of a system for assessing voice quality according to Embodiment 3 of the present invention.

This embodiment of the present invention further provides a system for assessing voice quality, as shown in FIG. 7, including:

at least two network elements, for example, as shown in FIG. 7, including a local-end network element 41, a peer-end network element 42, and a call history system CHR 43.

The local-end network element 41 is configured to acquire a voice code stream on a local end, and collect statistics on a transmission parameter of the local end in each short-time assessment period; decode the voice code stream, and collect statistics on a source parameter of the local end according to the decoded voice code stream; and calculate a comprehensive voice quality assessment result of the local end according to the transmission parameter of the local end and the source parameter of the local end.

The peer-end network element 42 is configured to acquire a voice code stream on a peer end, and collect statistics on a transmission parameter of the peer end in each short-time assessment period; decode the voice code stream, and collect statistics on a source parameter of the peer end according to the decoded voice code stream; and calculate a comprehensive voice quality assessment result of the peer end according to the transmission parameter of the peer end and the source parameter of the peer end.

The CHR 43 is configured to receive transmission parameters, source parameters, and short-time voice quality assessment results, which are sent by the at least two network elements, so that an external tool calculates an end-to-end voice quality assessment result.

According to the network element and system in this embodiment of the present invention, a comprehensive voice quality assessment result is calculated by collecting statistics on a transmission parameter corresponding to a voice code stream and on a source parameter corresponding to a decoded voice code stream. Compared with a method for assessing voice quality in the prior art, in which statistics is collected only on a transmission parameter corresponding to a voice code stream, the source parameter that can reflect user perception is brought in, so that the voice quality assessment result not only can reflect network transmission quality, but also can reflect actual user perception.

In addition, when statistics is collected on a packet loss rate and a burst packet loss ratio, a voice frame and a mute frame in the voice code stream are distinguished and statistics is collected on successive packet loss and intermittent packet loss in the voice frame that have different impacts on user perception, so that statistics on the transmission parameter may also reflect the user perception. A local-end network element and a peer-end network element report transmission parameters, source parameters, and short-time voice quality assessment results to a CHR and input the CHR to an external tool. The external tool calculates an end-to-end voice quality assessment result according to the transmission parameters, the source parameters, and the short-time voice quality assessment results that are reported by the local-end network element and the peer-end network element. Therefore, the voice quality assessment result not only can reflect voice quality on a single end, but also can reflect actual user perception after voice quality experiences end-to-end loss.

Embodiment 4

Figure 8:
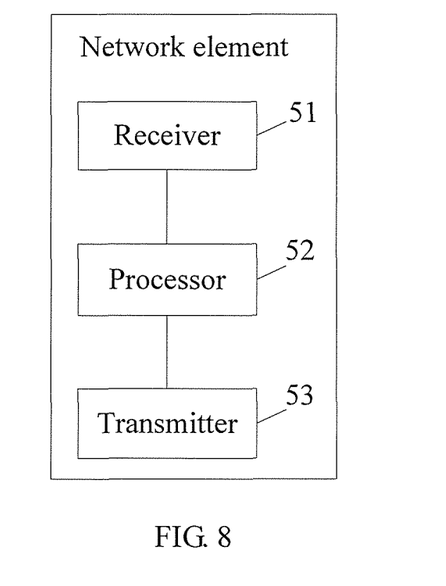
FIG. 8 is a diagram of an apparatus for assessing voice quality according to Embodiment 4 of the present invention.

This embodiment of the present invention further provides a network element, as shown in FIG. 8, including: a receiver 51 and a processor 52.

The receiver 51 is configured to acquire a voice code stream.

The processor 52 is configured to collect statistics on a transmission parameter in each short-time assessment period according to the voice code stream received by the receiver 51.

The processor 52 is further configured to decode the voice code stream, and collect statistics on a source parameter according to the decoded voice code stream.

The processor 52 is further configured to calculate a comprehensive voice quality assessment result according to the transmission parameter and the source parameter.

Further, the processor 52 is further configured to calculate a short-time voice quality assessment result in each short-time assessment period according to the transmission parameter, which is collected by the processor 52, in each short-time assessment period.

The transmission parameter collected by the processor 52 includes at least a packet loss rate, a burst packet loss ratio, a codec type, a situation in which signaling preempts voice, and a handover frequency.

The source parameter collected by the processor 52 includes at least one of the following: sound volume, background noise, clipping, and echo strength.

Further, the processor 52 is further configured to: identify a frame type of the voice code stream to distinguish between a voice frame and a mute frame, and collect statistics on a packet loss rate of the voice frame; and identify successive packet loss in the voice frame according to types of frames before and after a packet loss position and collect statistics on a burst packet loss ratio according to the successive packet loss.

Further, the processor 52 is further configured to: select an assessment model according to the codec type; accumulate the transmission parameter, which is collected by the processor 52, in each short-time assessment period to obtain a call-level transmission parameter; and substitute the call-level transmission parameter collected by the processor 52 and the source parameter collected by the processor 52 into the assessment model to calculate the comprehensive voice quality assessment result.

Further, then network element may further include: a transmitter 53.

The transmitter 53 is configured to report the transmission parameter collected by the processor 52, the source parameter collected by the processor 52, and the short-time voice quality assessment result calculated by the processor 52 to a call history system CHR, so that an external tool calculates an end-to-end voice quality assessment result according to the transmission parameter, the source parameter, the short-time voice quality assessment result, and a transmission parameter, a source parameter, and a short-time voice quality assessment result of a peer end.

According to the network element in this embodiment of the present invention, a comprehensive voice quality assessment result is calculated by collecting statistics on a transmission parameter corresponding to a voice code stream and on a source parameter corresponding to a decoded voice code stream. Compared with a method for assessing voice quality in the prior art, in which statistics is collected only on a transmission parameter corresponding to a voice code stream, the source parameter that can reflect user perception is brought in, so that the voice quality assessment result not only can reflect network transmission quality, but also can reflect actual user perception.

In addition, when statistics is collected on a packet loss rate and a burst packet loss ratio, a voice frame and a mute frame in the voice code stream are distinguished and statistics is collected on successive packet loss and intermittent packet loss in the voice frame that have different impacts on user perception, so that statistics on the transmission parameter may also reflect the user perception. A local-end network element and a peer-end network element report transmission parameters, source parameters, and short-time voice quality assessment results to a CHR and input the CHR to an external tool. The external tool calculates an end-to-end voice quality assessment result according to the transmission parameters, the source parameters, and the short-time voice quality assessment results that are reported by the local-end network element and the peer-end network element. Therefore, the voice quality assessment result not only can reflect voice quality on a single end, but also can reflect actual user perception after voice quality experiences end-to-end loss.

According to the description about the foregoing embodiments, a person skilled in the art may clearly understand that the present invention may be implemented by using software plus necessary universal hardware, and certainly may also be implemented by using hardware, but in most cases, the former is a preferred implementation manner. Based on such an understanding, the technical solutions of the present invention essentially or the part contributing to the prior art may be implemented in the form of a software product. The computer software product is stored in a readable storage medium, such as a floppy disk, a hard disk, or an optical disc, and includes several instructions for instructing a computer device (which may be a personal computer, a server, a network device, or the like) to perform the methods described in the embodiments of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for assessing voice quality, the method comprising:
    acquiring a voice code stream, and collecting statistics on a transmission parameter in each of a plurality of short-time assessment periods;
    decoding the voice code stream, and collecting statistics on a source parameter according to the decoded voice code stream; and
    calculating a comprehensive voice quality assessment result according to the transmission parameter and the source parameter.

2. The method for assessing voice quality according to claim 1, wherein after collecting statistics on a transmission parameter in the each short-time assessment period, the method further comprises:
    calculating a short-time voice quality assessment result in the each short-time assessment period according to the transmission parameter in the each short-time assessment period.

3. The method for assessing voice quality according to claim 1, wherein:
    the transmission parameter comprises at least one of the following: a packet loss rate, a burst packet loss ratio, a codec type, a situation in which signaling preempts voice, or a handover frequency; and
    the source parameter comprises at least one of the following: sound volume, background noise, clipping, or echo strength.

4. The method for assessing voice quality according to claim 3, wherein:
    a method for collecting statistics on the packet loss rate comprises: identifying a frame type of the voice code stream to distinguish between a voice frame and a mute frame; and collecting statistics on a packet loss rate of the voice frame; and
    a method for collecting statistics on the burst packet loss ratio comprises: identifying successive packet loss in the voice frame according to types of frames before and after a packet loss position; and collecting statistics on the burst packet loss ratio according to the successive packet loss.

5. The method for assessing voice quality according to claim 1, wherein calculating a comprehensive voice quality assessment result according to the transmission parameter and the source parameter comprises:
    selecting an assessment model according to the codec type;
    accumulating the transmission parameter in the each short-time assessment period to obtain a call-level transmission parameter; and
    substituting the call-level transmission parameter and the source parameter into the assessment model to calculate the comprehensive voice quality assessment result.

6. The method for assessing voice quality according to claim 1, further comprising:
    reporting the transmission parameter, the source parameter, and the short-time voice quality assessment result to a call history record (CHR) system, so that an external tool calculates an end-to-end voice quality assessment result according to the transmission parameter, the source parameter, the short-time voice quality assessment result, and a transmission parameter, a source parameter, and a short-time voice quality assessment result of a peer end.

7. A network element, comprising:
    a processor and a memory coupled to the processor; and
    wherein the processor is configured to:
        acquire a voice code stream, and collect statistics on a transmission parameter in each of a plurality of short-time assessment periods,
        decode the voice code stream, and collect statistics on a source parameter according to the decoded voice code stream, and
        calculate a comprehensive voice quality assessment result according to the transmission parameter and the source parameter collected by the processor.

8. The network element according to claim 7, wherein the processor is also configured to calculate a short-time voice quality assessment result in the each short-time assessment period according to the transmission parameter, which is collected by the processor, in the each short-time assessment period.

9. The network element according to claim 7, wherein
    the transmission parameter comprises at least one of the following: a packet loss rate, a burst packet loss ratio, a codec type, a situation in which signaling preempts voice, and a handover frequency; and
    the source parameter comprises at least one of the following: sound volume, background noise, clipping, and echo strength.

10. The network element according to claim 9, wherein the processor comprises:
    a packet loss rate statistics collecting module, configured to identify a frame type of the voice code stream to distinguish between a voice frame and a mute frame, and collect statistics on a packet loss rate of the voice frame; and
    a burst packet loss ratio statistics collecting module, configured to identify successive packet loss in the voice frame according to types of frames before and after a packet loss position, and collect statistics on a burst packet loss ratio according to the successive packet loss.

11. The network element according to claim 7, wherein the processor comprises:
    a selecting module, configured to select an assessment model according to the codec type;

an accumulating module, configured to accumulate the transmission parameter in the each short-time assessment period to obtain a call-level transmission parameter; and an assessing module, configured to substitute the call-level transmission parameter accumulated by the accumulating module and the source parameter into the assessment model to calculate the comprehensive voice quality assessment result.

12. The network element according to claim 7, further comprising:

a sender, configured to report the transmission parameter, the source parameter collected by the source statistics collecting unit, and the short-time voice quality assessment result calculated by the short-time assessment unit to a call history system (CHR), so that an external tool calculates an end-to-end voice quality assessment result according to the transmission parameter, the source parameter, the short-time voice quality assessment result, and a transmission parameter, a source parameter, and a short-time voice quality assessment result of a peer end.

13. A system for assessing voice quality, the system comprising:

at least two network elements according to claim 7; and a call history system (CHR) configured to receive transmission parameters, source parameters, and short-time voice quality assessment results, which are sent by the at least two network elements, so that an external tool calculates an end-to-end voice quality assessment result.

* * * * *